United States Patent

Okuma et al.

[11] Patent Number: 5,154,746
[45] Date of Patent: Oct. 13, 1992

[54] PROCESS AND APPARATUS FOR FORMING GLASS FILAMENTS

[75] Inventors: Kiwamu Okuma; Keiji Otaki; Mitsuji Yoda; Yukiyoshi Shinobu, all of Fukushima, Japan

[73] Assignees: Nitto Boseiki Co., Ltd.; Paramount Glass Mfg. Co., Ltd., Fukushima, Japan

[21] Appl. No.: 752,032

[22] Filed: Aug. 29, 1991

[30] Foreign Application Priority Data

Sep. 4, 1990 [JP] Japan .................... 2-234297

[51] Int. Cl.$^5$ .................................................. C03B 37/04
[52] U.S. Cl. ................................................. 65/6; 65/14
[58] Field of Search .............................. 65/6, 8, 14, 15

[56] References Cited

U.S. PATENT DOCUMENTS

| | | | |
|---|---|---|---|
| 3,084,525 | 4/1963 | Levecque et al. | 65/14 X |
| 3,254,977 | 6/1966 | Levecque et al. | 65/6 X |
| 3,523,774 | 8/1970 | Kleist | 65/6 X |
| 3,785,791 | 1/1974 | Perry | 65/14 |
| 3,928,009 | 12/1975 | Perry | 65/14 |
| 4,246,017 | 1/1981 | Phillips | 65/8 |
| 4,392,878 | 7/1983 | Okuma et al. | 65/6 |
| 4,392,879 | 7/1983 | Takeuchi et al. | 65/6 |

*Primary Examiner*—Robert L. Lindsay
*Attorney, Agent, or Firm*—Sixbey, Friedman, Leedom & Ferguson

[57] ABSTRACT

A process for forming glass filaments by utilizing centrifugal force, in which compressed gas is injected from a position near an interior of a flame port frame of a fiberizing burner toward a throat portion of a discharge port of the burner at an acute angle relative to the direction of discharge of a flame stream from the discharge port, so that the compressed gas is mixed with combustion exhaust gas at an inlet portion of the throat portion, and the mixed gas is injected from the discharge port of the burner in a direction generally parallel to the direction of the generatrix of the outer peripheral surface of the peripheral wall, thereby forming primary filaments into fine secondary filaments.

7 Claims, 4 Drawing Sheets

PROCESS AND APPARATUS FOR FORMING GLASS FILAMENTS

BACKGROUND OF THE INVENTION

This invention relates to a process and apparatus for forming glass filaments by utilization of centrifugal force.

A conventional process and apparatus for forming glass filaments by utilization of the centrifugal force will be described with reference to FIG. 5.

More specifically, molten glass B is continuously supplied from a nozzle K of a forehearth J of a glass melting furnace I to a hollow cylindrical rotary member A rotated at high speed by a drive device H. The molten glass supplied to the member A is discharged in small conical shapes from narrow holes D in a peripheral wall C of the rotary member A under the influence of a centrifugal force. Primary filaments formed on distal end portions of the conical shaped molten glass are fed into a stream G of flame injected from a flame port F of a fiberizing burner E, so that the primary filaments are attenuated into secondary filaments.

In order to form glass filaments being small in diameter and having high thermal insulative properties with this conventional method, various means have be proposed in the art.

A first means is to increase the flow velocity of the flame stream G, assuming that glass of the same kind is used. However, since, with this means, the amount of combustion of the fiberizing burner E must be increased, the temperature of the flame at the flame port F excessively increases and the proportion of formation of the primary filaments into non-fibrous materials of a spherical shape or a hooked shape is increased, thus adversely affecting the flocculent properties.

To avoid this phenomenon, there has been adopted means for increasing the amount of the air for the combustion, as described in U.S. Pat. No. 3,785,791; however, when the air-fuel ratio exceeds a certain value, the combustion becomes unstable, and the production of unburned fuel, an oscillating combustion and etc., are encountered, so that the flame temperature becomes quite uneven, which results in a drawback that the secondary filaments of a uniform diameter can not be obtained.

A second means is to reduce the diameter of the narrow holes D in the peripheral wall C to reduce the diameter of the primary filaments, thereby reducing the diameter of the secondary filaments to be obtained. However, when the diameter of the narrow holes D is reduced, the molten glass can not flow out easily, and therefore the following means need to be added: (a) means for decreasing the amount of supply of the molten glass; (b) means for increasing the number of rotations of the rotary member A; (c) means for increasing the temperature of the molten glass in the rotary member A to lower the viscosity thereof. The means (a) decreases the amount of production of the products, and the means (b) and (c) greatly shorten the lifetime of the rotary member A. Thus, these means are all undesirable.

As a third means, it can be considered to reduce the amount of flow of the molten glass from each narrow hole D (which is formed in the peripheral wall C of the rotary member A) per unit time (the amount of flow of the molten glass from each narrow hole is sometimes referred to as one transition cone amount); however, this reduces the amount of production of the secondary filaments to be obtained. To avoid this reduction of the production, it can be considered to increase the height of the peripheral wall C and to increase the number of the narrow holes D; however, if the height of the peripheral wall C is increased, the lower end portion of the peripheral wall C is remote from the flame port F of the fiberizing burner, and the secondary attenuating by the flame stream G becomes insufficient, so that it is difficult to form the secondary filaments in the vicinity of the lower end portion. Therefore, the height of the peripheral wall C is limited.

If one transition cone amount described above is reduced, the primary filaments become sensitive to the temperature of the flame stream G, and if the temperature is high, the primary filaments are liable to become non-fibrous materials of a spherical shape or a hooked shape, and the secondary filaments become liable to stick to each other, and the flocculent properties are lowered. Therefore, the flame stream temperature lower than usual is needed; however, as described above, the lowering of the flame temperature is limited, and if one transition cone amount is reduced, this must be dealt with by reducing the amount of combustion of the fuel of the fiberizing burner E so as to reduce the thermal energy, so that the distance of reach of the flame stream G becomes shorter. As a result, the height of the peripheral wall C is limited also from this aspect, which incurs a problem of a considerable production reduction.

There are many kinds of glass filaments, and glass filaments of many different diameters, ranging from a small to a large diameter, are required to be produced. However, with the conventional methods and apparatuses, to fiberize many kinds of glass filaments using a common apparatus is not desirable, since this incurs the production reduction, the increase of the thermal energy, a degraded quality of the products, and so on.

Naturally, it is not desirable to provide production lines for exclusive use for forming glass filaments of different kinds, respectively, since this increases the production cost.

SUMMARY OF THE INVENTION

With the current status of the above conventional art, it is an object of this invention to provide a process and apparatus for forming glass filaments in which the temperature of a flame stream formed by a fiberizing burner is lowered to a predetermined temperature without involving the production of unburned fuel and an unstable combustion, and wherein the flow velocity of the flame stream can be increased, and therefore height of a peripheral wall of a rotary member can be increased, even if the amount of flow of molten glass from each narrow hole (i.e., one transition cone amount) in the peripheral wall is decreased. Further, primary filaments of molten glass can be satisfactorily formed into secondary filaments over the entire height of the peripheral wall of the rotary member without causing thermal destruction of the primary filaments. As a result, fine glass filaments of high quality can be produced in an increased amount, and the fiberizing energy can be saved without increasing the amount of combustion of the fuel in the fiberizing burner.

To achieve the above noted and other objects, according to the invention as claimed in claim 1, there is provided a method of forming glass filaments by utilizing centrifugal force, in which compressed gas is injected from a position near an interior of a flame port frame of a fiberizing burner toward a throat portion of a discharge port of the burner at an acute angle relative to the direction of discharge of a flame stream from the discharge port, so that the compressed gas is mixed with combustion exhaust gas at an inlet portion of the throat portion, and the mixed gas is injected from the discharge port of the burner in a direction generally parallel to the direction of the generatrix of the outer peripheral surface of the peripheral wall, thereby forming primary filaments into fine secondary filaments.

There is also provided an apparatus for forming glass filaments, in which a number of orifices for injecting compressed gas are provided at an upper portion of a flame port frame within a fiberizing burner. The orifices are open toward an inlet portion of a throat portion of a discharge port, and the orifices are communicated with a source of supply of the compressed gas. Further, in a specific construction, the direction of injection of the compressed gas from the orifices is at an acute angle relative to a direction of injection of combustion exhaust gas from the discharge port of the fiberizing burner. Further, in a specific construction, a number of orifices for injecting the compressed gas are formed in the flame port frame of the fiberizing burner. Further, in a specific construction, a number of orifices for injecting the compressed gas are formed in a compressed gas chamber provided above the flame port frame within the fiberizing burner.

The method and apparatus of the present invention have the above construction. A required amount of fuel is burned by the fiberizing burner, and when its combustion exhaust gas is injected from the discharge port of the burner, the compressed gas is injected toward the throat portion of the discharge port from a number of orifices disposed near the interior of the flame port frame. The direction of injection of the compressed gas is at an acute angle relative to the direction of injection of the combustion exhaust gas from the discharge port. Since the compressed gas is directed toward the throat portion of the discharge port, the combustion exhaust gas is mixed with the injected compressed gas at the inlet portion of the throat portion. This mixing is affected at the inlet portion of the throat portion of the discharge port, and therefore will not affect the combustion of the fuel within the fiberizing burner, and will not change the combustion condition.

The temperature of the combustion exhaust gas is lowered by the mixing thereof with the compressed gas having no heat quantity, and since the direction of injection of the compressed gas is at an acute angle relative to the direction of injection of the combustion exhaust gas, the kinetic energy of the compressed gas is added in the injection direction. As a result, the resulting stream of flame, which is lower in temperature than the combustion exhaust gas (which has been produced by the fiberizing burner and has reached the discharge port) and has a greater injection pressure, is injected in a direction generally parallel to the outer peripheral surface of the peripheral wall.

Therefore, even if the height of the peripheral wall of the rotary member is greater than that of the conventional art, and even if each narrow hole has a smaller cone amount of the molten glass, the flame stream can reach the lower end of the peripheral wall with sufficient heat quantity and velocity. And besides, the temperature of the flame stream is lowered by the addition of the compressed gas, and therefore even if the primary filament is smaller in diameter than that of the conventional art because of the reduction of one cone amount of the molten glass, the primary filament will not be destroyed. Since the number of the narrow holes is increased thanks to the increased height of the peripheral wall, the total amount of production of the secondary filaments is not decreased, and since the injection pressure of the flame stream is increased by the addition of the compressed gas, the increase of the fuel consumption will not be involved.

Further, by selecting and adjusting the injection amount and injection pressure of the compressed gas, the heat quantity of the compressed gas, and etc., various kinds of glass filaments can be produced with the single apparatus.

DESCRIPTION OF THE PREFERRED EMBODIMENTS

Figure 1:
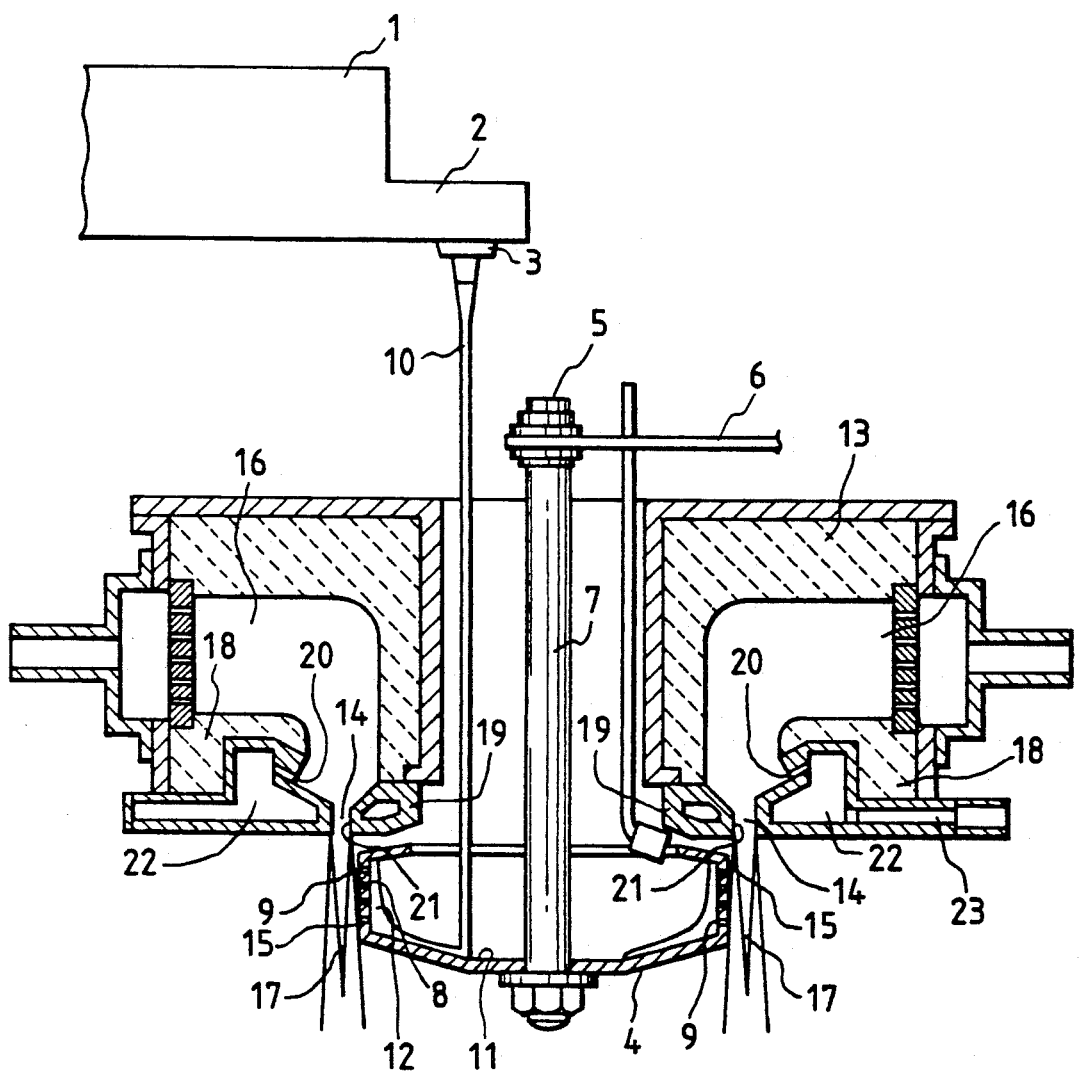
FIG. 1 is a schematic vertical cross-sectional view of one embodiment of the invention as claimed in claims 2, 3 and 4.
Figure 2:
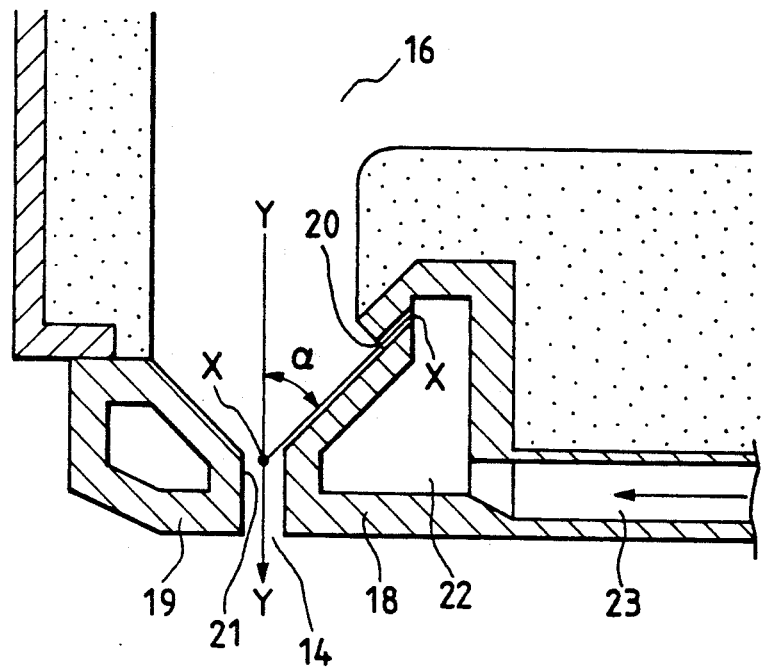
FIG. 2 is a schematic, enlarged cross-sectional view of an important portion of the construction of FIG. 1.
Figure 3:
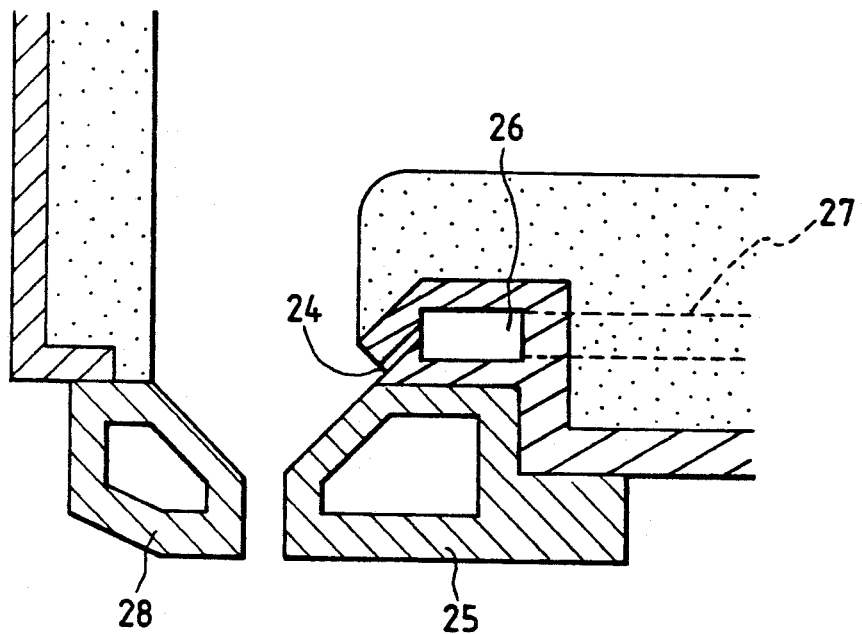
FIG. 3 is a schematic, enlarged cross-sectional view of an important portion of another embodiment as claimed in claim 5.

FIGS. 1 and 2 show one example of apparatus of the invention. FIG. 3 shows one example of an additional embodiment of the invention. The construction of these apparatuses will first be described, and then a method of the present invention will be described.

Referring to FIGS. 1 and 2, disposed beneath a molten glass discharge nozzle 3 of a forehearth 2 of a glass melting furnace 1 is a hollow cylindrical rotary member 4 connected to a drive device 5.

The drive device 5 is supported on a frame (not shown), and comprises a rotation shaft 7 rotated by a belt 6. The rotary member 4 is fixedly connected to the lower end of the rotation shaft 7.

The rotary member 4 has a number of narrow holes 9 formed so as to pass through its peripheral wall 8 over an entire periphery of the peripheral wall 8. Molten glass 10, discharged from the molten glass discharge nozzle 3 and flowed downward, is received by a bottom wall 11 of the rotary member 4, and the molten glass 12, caused to rise along the peripheral surface of the peripheral wall 8 by a high-speed rotation of the rotary member 8 by the drive device 5, are injected in small conical shapes from the narrow holes 9 under the influence of a centrifugal force to thereby provide primary filaments which are further fed and attenuated radially outwardly under the influence of the centrifugal force.

A fiberizing burner 13 is mounted above the rotary member 4 in surrounding relation to the outer peripheral portion of the rotary member 4. A discharge port 14 of this fiberizing burner is open in a direction parallel to the direction of the generatrix of an outer peripheral surface 15 of the peripheral wall 8, and combustion exhaust gas, produced in a combustion chamber 16 of the fiberizing burner 13, is injected, as a stream 17 of flame, along the outer peripheral surface 15 of the peripheral wall 8. The flame stream 17 forms the glass, discharged from the narrow holes 9 and formed into the primary filaments under the influence of the centrifugal force, into fine secondary filaments.

The discharge port 14 is defined by an outer flame port frame 18 and an inner flame port frame 19, and a number of orifices 20 for injecting compressed gas are formed in the upper portion of the outer flame port frame 18 close to the combustion chamber 16 of the fiberizing burner 13.

Each orifice 20 is open toward an inlet of a throat portion 21 of the discharge port 14, and an angle α between its injection direction X—X and the flame stream 17 (i.e., the direction Y—Y of injection of the combustion exhaust gas) at the discharge port 14 is acute.

The orifice 20 is communicated with an inner cavity 22 of the outer flame port frame 18, and the inner cavity 22 is communicated via a compressed gas supply passage 23 to a source of supply of compressed gas, such as the air and inert gas (e.g. nitrogen gas and carbon dioxide gas).

In the embodiment shown in FIGS. 1 and 2, the orifices 20 as well as the inner cavity 22 to which the compressed gas is supplied, is provided at the outer flame port frame 18; however, in a second embodiment shown in FIG. 3, orifices 24 for injecting compressed gas are formed in a gas chamber 26 provided above an outer flame port frame 25, and the gas chamber 26 is communicated with a source of supply of compressed gas (not shown) via a compressed gas supply passage 27. Except for these points, the second embodiment is identical in construction to the first embodiment.

In both of the first embodiment of FIGS. 1 and 2 and the embodiment of FIG. 3, although the orifices 20, 24 are formed only in the outer flame port frame 18, 25, identical orifices may be formed also in the inner flame port frame 19, 28 so that the compressed gas can be injected to the inlet of the throat portion of the discharge port both from the inner and outer sides.

A method of forming glass filaments using the above-mentioned glass filament formation apparatus will be described below.

Fuel is completely burned in the combustion chamber 16 of the fiberizing burner 13, and the combustion exhaust gas of high temperature is injected from the discharge port 14, and also the compressed gas, obtained by compressing the air or the inert gas, is injected toward the inlet of the throat portion 21 of the discharge port 14 at an acute angle relative to the direction of injection of the combustion exhaust gas from the discharge port, so that the compressed gas is mixed with the combustion exhaust gas at the inlet portion. By this mixing, the temperature of the combustion exhaust gas injected from the discharge port 14 is lowered to a predetermined temperature, and also the injection pressure is increased.

The combustion exhaust gas, thus lowered in temperature and increased in velocity, is injected, as the flame stream 17, from the discharge port 14 in a direction generally parallel to the direction of the generatrix of the peripheral wall 8 of the rotary member 4.

Simultaneously with this operation, the molten glass 10 is continuously supplied from the molten glass discharge nozzle 3 into the rotary member 4 rotating at high speed.

The thus-supplied molten glass 10 is discharged in small conical shapes from the narrow holes 9 in the peripheral wall 8 of the rotary member 4, and is further attenuated into the primary filaments under the influence of the centrifugal force, and the primary filaments are further fed radially outwardly of the rotary member 4 respectively from the apexes of the above small conical shaped molten glass into the flame stream 17, and are formed by the flame stream 17 into fine secondary filaments. The secondary filaments are thrown downward, and are collected by a collector device (not shown).

As described above, thanks to the injection of the compressed gas, the temperature of the flame stream 17 is lowered to a temperature lower than the temperature of the combustion exhaust gas produced in the combustion chamber 16. Therefore, the temperature of the flame stream 17 in contact with the upper edge portion of the peripheral wall 8 of the rotary member 4 can be lowered to a predetermined low temperature, and even if the amount of discharge of the molten glass from each narrow hole 9 (i.e., one cone amount) is small, the temperature can be kept to such a level as to prevent thermal destruction of the primary filament to be formed. Also, since the injection of the above compressed gas can increase the pressure of injection of the flame stream 17, the flame stream 17 can reach farther without a loss of the thermal energy of the flame stream 17, and therefore the height of the peripheral wall 8 can be increased, so that the number of the narrow holes 9 can be increased. Therefore, the decrease in one cone amount is compensated for by the increase of the number of the narrow holes 9.

The glass filament-forming method of the present invention comprises the above-mentioned steps.

A comparison between the present invention and the conventional art will be described below with reference to specific embodiments.

[I] Temperature difference (°C.) between the lower end of the discharge port of the fiberizing burner and the lower end of the peripheral wall of the rotary member (L represents the distance between the two lower ends)

| | Compressed gas amount (m³/Hr) | Fuel gas amount (18 m³/Hr) | |
|---|---|---|---|
| | | L = 65 mm | L = 83 mm |
| Conventional Art | 0 | 105° C. | — |
| Present Invention | 110 | 76° C. | 105° C. |
| Conventional Art | 0 | 91° C. | — |
| Present Invention | 180 | 70° C. | 95° C. |

As is clear from this table, according to the present invention, the temperature of the flame stream at the lower end of the peripheral wall of the rotary member is less lowered.

TABLE 1

Figure 4:
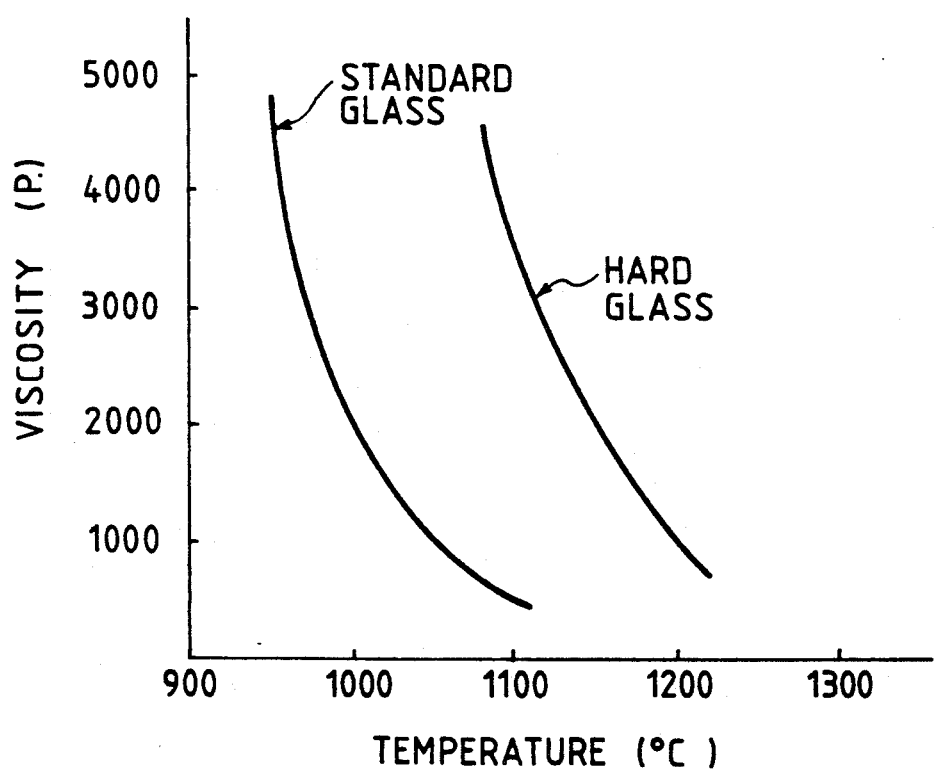
FIG. 4 is a graph showing the relation between the temperature and viscosity of glass for the formation of glass filaments.
Figure 5:
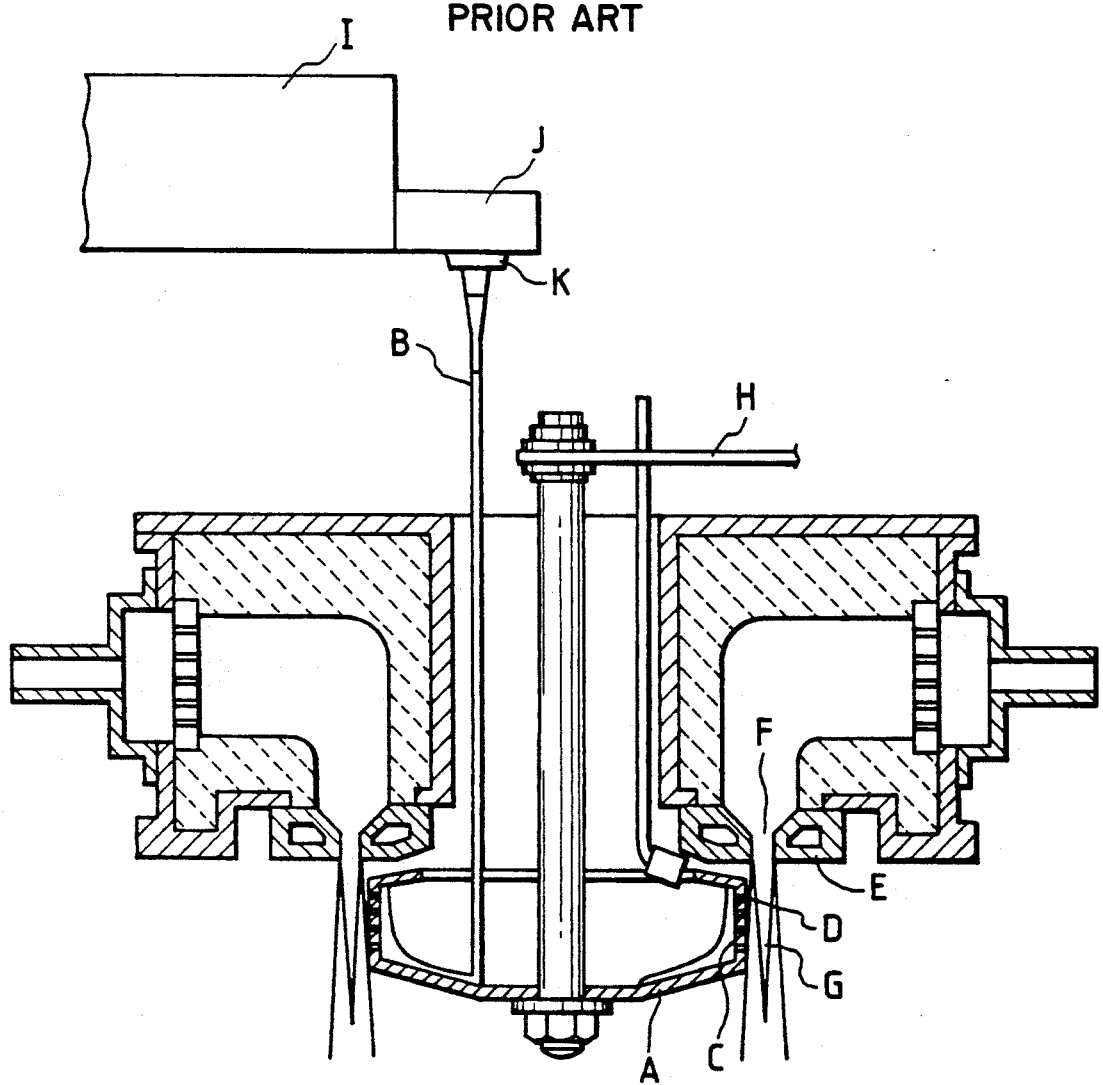
FIG. 5 is a schematic vertical cross-sectional view of a conventional apparatus.

[II] Fiberizing examples using hard glass and standard glass of natures shown in FIG. 4 used for formation of glass filaments
(1) Hard glass

| | Present invention | Conventional art |
|---|---|---|
| Fiberizing amount (kg/Hr) | 400 | 320 |
| Peripheral wall height (mm) | 71 | 58 |
| Fuel gas amount (m³/Hr) | 21 | 21 |

TABLE 1-continued

[II] Fiberizing examples using hard glass and standard glass of natures shown in FIG. 4 used for formation of glass filaments (1) Hard glass

| | Present invention | Conventional art |
|---|---|---|
| Compressed gas amount (m³/Hr) | 140 | 0 |
| Average filament diameter (μm) | 6 | 6 |
| Flocculency | good (lustrous and strong) | Average (slightly entangled) |
| Energy index (fuel gas amount/fiberizing amount) (m³/TON) | 52.5 | 65.6 |

TABLE 2

| | Present invention | | Conventional Art |
|---|---|---|---|
| | product of high thermal insulation | ordinary product | ordinary product |
| Fiberizing amount (kg/Hr) | 400 | 400 | 400 |
| Peripheral wall height (mm) | 71 | 71 | 58 |
| Fuel gas amount (m³/Hr) | 21 | 14 | 17 |
| Average filament diameter (μm) | 6.0 | 7.5 | 7.5 |
| Flocculency | good (lustrous, strong yarn) | good (lustrous, strong yarn) | average |
| Compression recovery (%) | 115 | 120 | 105 |
| Energy index (m³/TON) | 52.5 | 35.0 | 42.5 |
| Compressed air amount (m³/Hr) | 140 | 70 | 0 |

TABLE 3

(2) Standard glass

| | Present invention | | Conventional Art |
|---|---|---|---|
| | product of high thermal insulation | ordinary product | ordinary product |
| Fiberizing amount (kg/Hr) | 400 | 400 | 400 |
| Peripheral wall height (mm) | 71 | 71 | 58 |
| Fuel gas amount (m³/Hr) | 23 | 14 | 17 |
| Average filament diameter (μm) | 4.5 | 7.0 | 7.0 |
| Flocculency | good (lustrous, strong yarn) | good (lustrous, strong yarn) | average |
| Compression recovery (%) | 120 | 130 | 110 |
| Energy index (m³/TON) | 57.5 | 35.0 | 42.5 |
| Compressed air amount (m³/Hr) | 260 | 140 | 0 |

As can be clearly appreciated from the numerical values in Table 1, with the same fuel consumption, a larger amount of glass filaments can be produced by the present invention than by the conventional art, and besides the flocculency obtained in the present invention is more excellent. Therefore, it is clearly appreciated that according to the present invention, the energy index can be greatly reduced, and the amount of production of the glass filaments can be increased.

As can be clearly appreciated from Tables 2 and 3, when the glass filaments of the ordinary-type are produced in the same amount respectively by the method of the present invention and the method of the conventional art, the fuel consumption is less in the present invention than in the conventional art, and the flocculency of the glass filaments of the present invention is more excellent. It is also appreciated that even the high-quality glass filaments of the high thermal insulation type can be produced without involving a large increase of the fuel consumption as compared with the conventional art.

One reason why the glass filaments of good quality can be obtained as shown in Tables 2 and 3 is that in the method and apparatus of the present invention, the primary filaments are not rendered non-fibrous (that is, not subjected to a filament destroy), as described above. On the other hand, in the conventional art, the intermediate portion of the peripheral wall is higher in temperature than the upper and lower portions of the peripheral wall, and therefore the primary filaments, discharged from the upper portion of the peripheral wall, are formed into the secondary filaments while moving across the distal end portions of the primary filaments, discharged from the intermediate portion of the peripheral wall, during the passage through the secondary filament-formation region, so that the primary filaments intersect the secondary filaments. It is thought that this would degrade the quality.

The feature of the method and apparatus of the present invention resides in the injection of the compressed gas, and the position of this injection. The angle of injection of the compressed gas relative to the direction of injection of the flame stream, the injection velocity distribution, the amount of the gas, and the pressure of the gas are also important factors.

With regards to the position of injection of the compressed air, this gas is not a secondary combustion air, and therefore it is necessary that this position should be at the position where the combustion of the fuel within the fiberizing burner is completed, and also should be close to the discharge port of this burner. Moreover, the position of injection also should be at the position where the combustion exhaust gas and the compressed gas are mixed together and then are formed into a neat flow, and are discharged as the flame stream from the discharge port. This position is at the inlet portion of the throat portion of the discharge port.

For achieving the above neat flow, it is necessary that the above position should be at the throat portion of the discharge port having parallel inner peripheral surfaces.

With regards to the injection angle, from the view points of effective use of the energy of the injected compressed gas and of the smooth discharge of the combustion exhaust gas, the centerline of the injection stream of the compressed air is inclined at an angle of 30° to 60° relative to the centerline of the flame stream injected from the discharge port. The smaller this angle is, the better. If this angle is an obtuse angle, the discharge of the combustion exhaust gas is prevented, and an unstable combustion is encountered. In the above embodiments, this is angle is 45°.

It is necessary that the velocity distribution of the compressed gas in the direction of the circumference of the rotary member be even. If this distribution is uneven, the temperature and velocity of the flame stream injected from the discharge port of the fiberizing burner become uneven, so that the quality of the resultant secondary filaments is lowered.

For this reason, preferably, the orifices should have a small diameter, and should be arranged at equal close intervals in the circumferential direction. Preferably, this diameter is in the range of 1 to 3 mm, and the interval is in the range of 5 to 10 mm.

In the above embodiments, the diameter is 2 mm, and the interval is 6.5 mm.

The amount of injection of the compressed gas is determined depending on the diameter of the rotary member, the height of the peripheral wall of the rotary member, the diameter of the glass filaments to be formed, and the amount of the combustion exhaust gas of the fiberizing burner. The larger the diameter of the rotary member, the larger the height of the peripheral wall, the finer the glass filaments to be produced, and the larger the amount of the combustion exhaust gas of the fiberizing burner, the larger the amount of injection of the compressed gas.

The pressure of the compressed gas need only to be such as to overcome the internal pressure of the fiberizing burner. In the above embodiments, the compressed air having a supply pressure of 5 kg/cm$^2$ is used.

The method and apparatus of the present invention have the above-mentioned construction and operation, and according to the invention, the temperature of the flame stream injected from the discharge port of the fiberizing burner can be lowered without influencing the combustion within the burner, and also the velocity of the flame stream can be increased. Therefore, there is achieved an advantage that the fine glass filaments of high quality can be produced in a larger amount without increasing the fuel consumption.

According to the invention, the compressed gas is mixed with the combustion exhaust gas at the throat portion of the discharge port to lower the temperature, and is formed into a neat flow and also increased in velocity when passing through the discharge port. Therefore, there is achieved an advantage that even if the height of the peripheral wall of the rotary member is increased, the effective flame stream can reach the lower end of the peripheral wall.

As compared with the conventional art, even if the height of the peripheral wall is greater, and even if each narrow hole has a smaller diameter to reduce one transition cone amount, the fine primary filaments would not be subjected to destruction, and therefore there is achieved an advantage that the glass filaments of high quality can be produced without decreasing the amount of production thereof.

The temperature of the combustion exhaust gas of the fiberizing burner is lowered by the injection of the compressed gas, and also the pressure of injection of the flame stream is increased by the injection energy of the compressed gas. Therefore, there is achieved an advantage that the increase of the fuel consumption is not involved.

With respect to the method and apparatus of the present invention, by selecting and adjusting the injection amount of the compressed gas, the injection pressure, the heat quantity of the gas, and etc., various kinds of glass filaments can advantageously be produced by the single method and the single apparatus.

What is claimed is:

1. A process for forming glass filaments, comprising the steps of:

(a) supplying molten glass into a hollow cylindrical rotary member having a number of narrow holes formed through a peripheral wall of said rotary member;

(b) discharging the molten glass in small conical shapes from said narrow holes in said peripheral wall under the influence of a centrifugal force caused by a high-speed rotation of said rotary member;

(c) injecting a stream of flame, at a region around an outer periphery of said peripheral wall, from a discharge port of a fiberizing burner in a direction generally parallel to a direction of the generatrix of an outer peripheral surface of said peripheral wall;

(d) injecting compressed gas from a position near said discharge port and within said fiberizing burner, toward a throat portion of said discharge port at an acute angle relative to the direction of discharge of said flame stream from said discharge port;

(e) mixing said compressed gas with said stream of flame at an inlet portion of said throat portion, (f) injecting said mixed gas from said discharge port of said burner in a direction generally parallel to the direction of the generatrix of said outer peripheral surface of said peripheral wall; and (g) introducing primary filaments formed on distal ends of the conical shaped molten glass, into said mixed gas under the influence of the centrifugal force so that said primary filaments are attenuated to fine secondary filaments.

2. Apparatus for forming glass filaments, comprising:

a hollow cylindrical rotary member having a number of narrow holes formed through a peripheral wall of said rotary member;

means for melting glass material and supplying molten glass into said hollow cylindrical member, disposed above said hollow cylindrical rotary member;

means for rotating said rotary member, connected to said hollow cylindrical rotary member;

a fiberizing burner disposed at a region around an outer periphery of said peripheral wall of said rotary member, said burner having a discharge port which is open in a direction parallel to a direction of the generatrix of an outer peripheral surface of said peripheral wall;

means for injecting compressed gas through a number of orifices, provided near said discharge port and within said fiberizing burner, said orifices being open toward an inlet portion of a throat portion of said discharge port and being communicated with a source of supply of the compressed gas.

3. Apparatus according to claim 2, wherein the direction of injection of the compressed gas from said orifices is at an acute angle relative to a direction of injection of combustion exhaust gas from said discharge port of said fiberizing burner.

4. Apparatus according to claim 2, wherein said fiberizing burner includes a flame port frame for defining said discharge port, and said orifices are formed in said flame port frame of said fiberizing burner.

5. Apparatus according to claim 2, wherein said fiberizing burner includes a flame port frame for defining said discharge port, and said orifices are formed in a compressed gas chamber provided above said flame port frame within said fiberizing burner.

6. A process according to claim 1, wherein said compressed gas is injected at an inlet portion of the throat portion of said discharge port of said burner, said inlet portion being located where combustion within said burner is complete.

7. Apparatus according to claim 2, wherein said means for injecting compressed gas is located at an inlet portion of the throat portion of said discharge port of said burner, said inlet portion being located where combustion within said burner is complete.

* * * * *